US011158455B2

(12) United States Patent
Yoon et al.

(10) Patent No.: US 11,158,455 B2
(45) Date of Patent: Oct. 26, 2021

(54) ELECTRONIC COMPONENT HAVING BODY WITH EXPOSED LOWER PORTION

(71) Applicant: SAMSUNG ELECTRO-MECHANICS CO., LTD., Suwon-si (KR)

(72) Inventors: Chan Yoon, Suwon-si (KR); Sang Soo Park, Suwon-si (KR); Hwi Dae Kim, Suwon-si (KR); Woo Chul Shin, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/673,133

(22) Filed: Nov. 4, 2019

(65) Prior Publication Data

US 2020/0402714 A1    Dec. 24, 2020

(30) Foreign Application Priority Data

Jun. 24, 2019 (KR) .................. 10-2019-0074972

(51) Int. Cl.
*H01G 2/22* (2006.01)
*H01G 4/232* (2006.01)
(Continued)

(52) U.S. Cl.
CPC ............... *H01G 2/22* (2013.01); *H01G 4/12* (2013.01); *H01G 4/224* (2013.01); *H01G 4/232* (2013.01); *H01G 4/30* (2013.01)

(58) Field of Classification Search
CPC ............ H01G 2/22; H01G 4/224; H01G 4/30; H01G 4/232; H01G 4/12
See application file for complete search history.

(56) References Cited

U.S. PATENT DOCUMENTS 9,818,511 B2   11/2017   Mori et al.
9,818,543 B2   11/2017   Tahara et al.
(Continued)

FOREIGN PATENT DOCUMENTS

CN    102891006 A    1/2013
CN    104465078 A    3/2015
(Continued)

OTHER PUBLICATIONS

Chinese Office Action dated Aug. 4, 2021 issued in Chinese Patent Application No. 202010045210.8 (with English translation).

*Primary Examiner* — David M Sinclair
(74) *Attorney, Agent, or Firm* — Morgan, Lewis & Bockius LLP

(57) ABSTRACT

An electronic component includes a capacitor body including a dielectric layer and first and second internal electrodes, and a first to sixth surfaces, the first and the second internal electrodes being exposed through the third and the fourth surfaces, respectively; first and second external electrodes respectively extending from the third and fourth surfaces of the body to a portion of the first surface and respectively connected to the first and second internal electrodes; a shielding layer comprising a cap portion disposed on the second surface of the capacitor body and a side wall portion disposed on the third, fourth, fifth and sixth surfaces of the capacitor body; and an insulating layer disposed between the capacitor body and the shielding layer. A lower portion of the capacitor body is exposed from the insulating layer and the shielding layer.

16 Claims, 5 Drawing Sheets

(51) Int. Cl.
  *H01G 4/30* (2006.01)
  *H01G 4/224* (2006.01)
  *H01G 4/12* (2006.01)

(56) References Cited

U.S. PATENT DOCUMENTS

| | | | |
|---|---|---|---|
| 10,186,367 B2 * | 1/2019 | Lee | H05K 9/0026 |
| 10,797,003 B2 * | 10/2020 | Takizawa | H01L 23/3121 |
| 2013/0020913 A1 * | 1/2013 | Shirakawa | H01G 4/232 |
| | | | 310/364 |
| 2015/0084481 A1 | 3/2015 | Mori et al. | |
| 2015/0084487 A1 * | 3/2015 | Mori | H01L 41/0472 |
| | | | 310/364 |
| 2015/0364253 A1 * | 12/2015 | Arnold | G10K 11/16 |
| | | | 174/260 |
| 2017/0154731 A1 * | 6/2017 | Tahara | H01G 4/30 |
| 2017/0278633 A1 * | 9/2017 | Kato | H01G 4/2325 |
| 2018/0130603 A1 | 5/2018 | Chong et al. | |
| 2018/0182550 A1 | 6/2018 | Sasaki et al. | |
| 2018/0315545 A1 * | 11/2018 | Kusumoto | H01G 4/38 |
| 2019/0096581 A1 * | 3/2019 | Masoleh | H05K 1/181 |

FOREIGN PATENT DOCUMENTS

| | | | | |
|---|---|---|---|---|
| CN | 104465090 A | 3/2015 | | |
| CN | 105845296 A | 8/2016 | | |
| CN | 107045937 A | 8/2017 | | |
| CN | 108231416 A | 6/2018 | | |
| JP | 2018186205 A | * | 11/2018 | H01F 27/36 |
| KR | 10-2018-0050004 A | 5/2018 | | |
| WO | 2013183632 A1 | 12/2013 | | |

* cited by examiner

ELECTRONIC COMPONENT HAVING BODY WITH EXPOSED LOWER PORTION

CROSS-REFERENCE TO RELATED APPLICATION(S)

This application claims benefit of priority to Korean Patent Application No. 10-2019-0074972 filed on Jun. 24, 2019 in the Korean Intellectual Property Office, the disclosure of which is incorporated herein by reference in its entirety.

TECHNICAL FIELD

The present disclosure relates to an electronic component.

BACKGROUND

Electronic components employing ceramic materials are commonly capacitors, inductors, piezoelectric elements, varistors or thermistors, and the like.

Electronic devices in which such electronic components are used are gradually becoming highly efficient and miniaturized. Accordingly, electronic components used in the electronic devices are also miniaturized and highly efficient.

In particular, due to mobile phones which have become highly efficient and thinner, densification and multilayer lamination of substrate mounting are sustainedly progressing. In this regard, an RF performance in a set may be reduced due to electromagnetic interference (EMI) noise, and a radiated magnetic field may have a devastating effect on a low power signal such as GPS or Wi-Fi.

Accordingly, there has been increasing demand for a technique for removing or shielding a source of noise such as EMI.

A conventional EMI-shielding technique involves mounting an electronic component on a substrate and surrounding both electronic component and substrates with a shield can. This causes an increased volume not only in a Z direction but also in X and Y directions, thereby not conforming to a current trend for the densification and multilayer lamination in substrate mounting.

In such an aspect, an effective technique facilitating shielding of the EMI noise of an electronic component itself is demanding.

SUMMARY

An aspect of the present disclosure is to provide an electronic component capable of substantially retaining component characteristics while reducing leakage flux.

Another aspect is to provide an electronic component capable of preventing a short between a solder and an EMI-shielding layer when mounting the electronic component.

According to an aspect of the present disclosure, an electronic component includes a capacitor body including a dielectric layer and first and second internal electrodes, and a first surface and a second surface opposing each other, a third surface and a fourth surface connected to the first and second surfaces and opposing each other, and a fifth surface and a sixth surface connected to the first to fourth surfaces and opposing each other, the first internal electrode and the second internal electrode being exposed through the third surface and the fourth surface, respectively; first and second external electrodes respectively extending from the third and fourth surfaces of the body to a portion of the first surface and respectively connected to the first and second internal electrodes; a shielding layer comprising a cap portion disposed on the second surface of the capacitor body and a side wall portion disposed on the third, fourth, fifth and sixth surfaces of the capacitor body; and an insulating layer disposed between the capacitor body and the shielding layer. A lower portion of the capacitor body is exposed from the insulating layer and the shielding layer.

In an example embodiment, a height of the insulating layer and the shielding layer in a direction connecting first and second surfaces may be shorter than an overall height of the capacitor body in a direction connecting the first and second surfaces, which may result in a region of the lower portion of the capacitor body, on which the insulating layer and the shielding layer are not formed.

In an example embodiment, a height (t) of the lower portion of the capacitor body, on which the insulating layer and the shielding layer are not formed, may satisfy $50\ \mu m < t < 150\ \mu m$.

In an example embodiment, a ratio of the height of the lower portion of the capacitor body, on which the insulating layer and the shielding layer are not formed, to the overall height of the capacitor body may satisfy $0.0625 \le t/T \le 0.1875$.

In an example embodiment, the electronic component may further comprise a cover layer disposed on the shielding layer and made of an insulating material.

In an example embodiment, the lower portion of the capacitor body may be exposed from the cover layer.

In an example embodiment, the first and second external electrodes may include first and second connection portions respectively disposed on the third and fourth surfaces of the capacitor body and connected to the first and second internal electrodes; and first and second band portions respectively extending from the first and second connection portions to the portion of the first surface of the capacitor body.

In an example embodiment, among the first and second surfaces, the first and second band portions of the first and second external electrodes may be disposed only on the first surface of the capacitor body, and the insulating layer and the shielding layer may have a flat top surface.

In an example embodiment, the first and second band portions may further extend onto portions of the second, fifth and sixth surfaces of the capacitor body.

In an example embodiment, each of the insulating layer and the shielding layer disposed on the second surface may have a concave shape.

In an example embodiment, the insulating layer may be formed of an adhesive layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
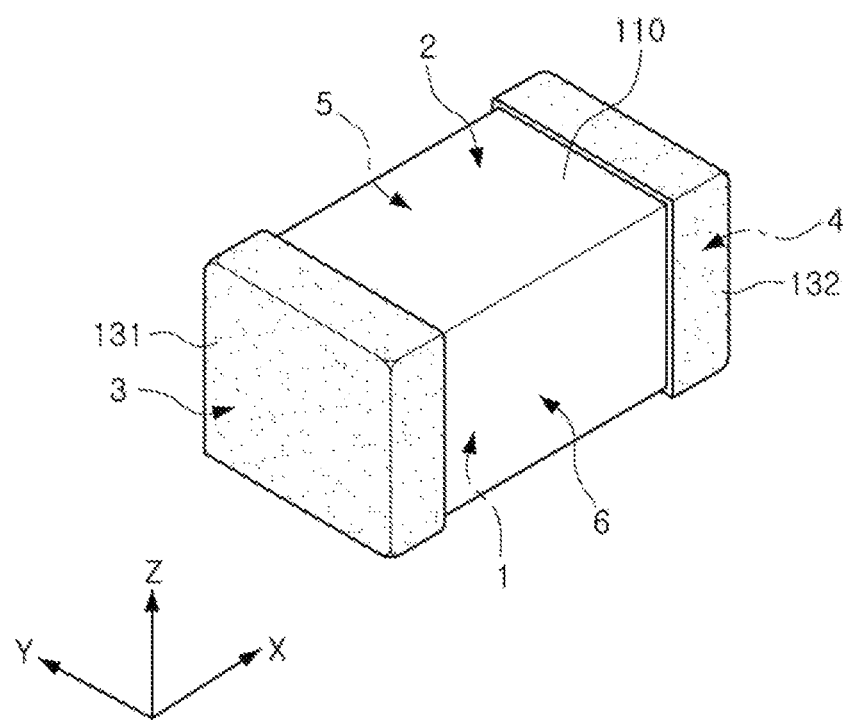
FIG. 1 is a schematic perspective view of a capacitor body and external electrodes applied to an electronic component according to an example embodiment of the present disclosure.

Hereinafter, embodiments of the present disclosure will be described as follows with reference to the attached drawings.

However, the invention may be embodied in many different forms and should not be construed as being limited to the embodiments set forth herein.

Rather, these embodiments are provided so that this disclosure will be thorough and complete, and will fully convey the scope of the invention to those skilled in the art.

Accordingly, the shapes and dimensions of elements in the drawings may be exaggerated for clarity, and the same reference numerals will be used throughout to designate the same or like elements.

Further, the same reference numerals are used throughout the drawings for the elements having similar functions and activities.

In the specification, unless otherwise specifically indicated, when a certain part "includes" a certain component, it is understood that other components may be further included but are not excluded.

To clearly describe the example embodiments, X, Y and Z indicated in the drawings are defined to represent a length direction, a width direction and a thickness direction, respectively, of the capacitor body in an electronic component.

Additionally, the Z direction may be used in the same sense as a lamination direction in which the dielectric layers are stacked up.

Figure 2A:
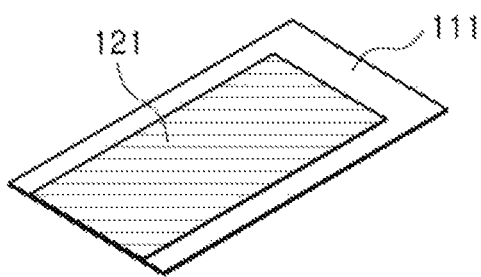
FIGS. 2A and 2B are perspective views of first and second internal electrodes applied to the electronic component of FIG. 1.
Figure 2B:
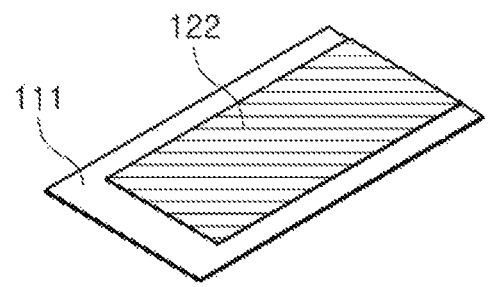
Figure 3:
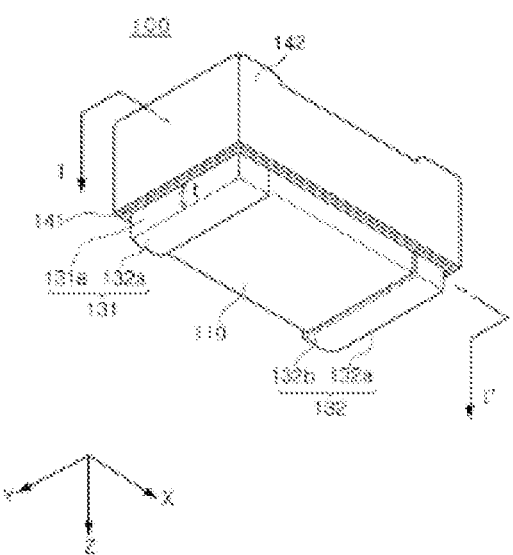
FIG. 3 is a schematic perspective view of the electronic component according to an example embodiment taken from below.
Figure 4:
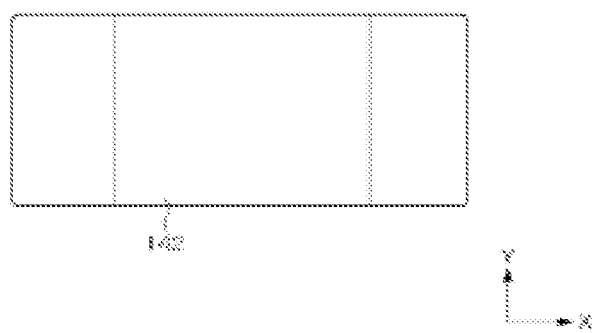
FIG. 4 is a plan view of FIG. 3.
Figure 5:
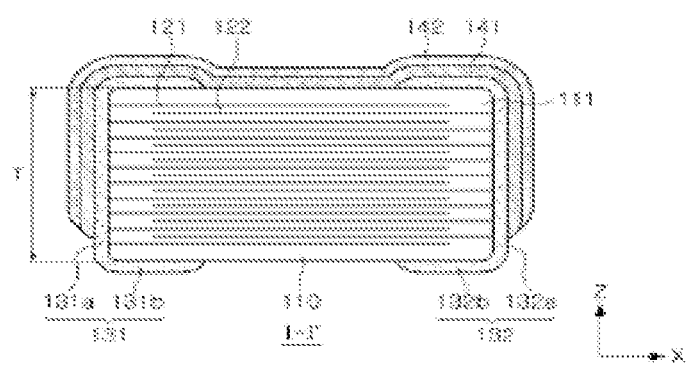
FIG. 5 is a cross-sectional view taken along line I-I' of FIG. 3.

FIG. 1 is a schematic perspective view of a capacitor body and external electrodes applied to an electronic component according to an example embodiment of the present disclosure, and FIGS. 2A and 2B are perspective views of first and second internal electrodes applied to the electronic component of FIG. 1, while FIG. 3 is a schematic perspective view of the electronic component according to an example embodiment taken from below, FIG. 4 is a plan view of FIG. 3, and FIG. 5 is a cross-sectional view taken along line I-I' of FIG. 3.

Hereinbelow, the electronic component of the example embodiments will be described in reference to FIGS. 1 to 5.

Referring to FIGS. 1 to 5, an electronic component 100 of an example embodiment includes a capacitor body 110, first and second external electrodes 131 and 132, a shielding layer 142 and an insulating layer 141.

A height of the insulating layer 141 and the shielding layer 142 in the Z direction connecting first and second surfaces is shorter than an overall height of the capacitor body 110 in the Z direction connecting the first and second surfaces, which may result in the lower portion of the capacitor body 110, in which the insulating layer 141 and the shielding layer 142 are not formed.

In this regard, the lower portion of the capacitor body 110 is exposed from the insulating layer 141 and the shielding layer 142 and not covered by the insulating layer 141 and the shielding layer 142.

The capacitor body 110 is formed by laminating a plurality of dielectric layers 111 in the Z direction and sintering. The adjacent dielectric layers 111 of the capacitor body may be integrated with each other so that boundaries therebetween are not readily apparent without using a scanning electron microscope (SEM).

Additionally, the capacitor body 110 includes the plurality of dielectric layers 111 and first and second internal electrodes 121 and 122 having different polarities and alternately disposed with respective dielectric layers 111 interposed therebetween in the Z direction.

The capacitor body 110 may include an active region in which the first and second internal electrodes 121 and 122 are alternately disposed with respective dielectric layers 111 interposed therebetween as a portion contributing to generation of capacity of a capacitor, and upper portion and low portion cover regions disposed on upper and lower surfaces of the active region in the Z direction as a margin portion.

Such a capacitor body 110 is not particularly limited in terms of a configuration thereof, but may be hexahedral. The capacitor body 110 may include a first surface and a second surface 1 and 2 opposing each other in the Z direction, a third surface and a fourth surface 3 and 4 connected to the first and second surfaces 1 and 2 and opposing each other in the X direction, and a fifth surface and a sixth surface 5 and 6 connected to the first and second surfaces 1 and 2 and the third and fourth surfaces 3 and 4 and opposing each other, where the first surface 1 can be a mounting surface.

The dielectric layers 11 may include ceramic powder, for example, $BaTiO_3$-based ceramic powder, or the like.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, or the like, in which calcium (Ca), zirconium (Zr), or the like, is included in $BaTiO_3$, but is not limited thereto.

In addition to the ceramic powder, a ceramic additive, an organic solvent, a plasticizer, a binder and a dispersant, or the like, may be further included in the dielectric layers 111.

The ceramic additive may include, for example, a transition metal oxide or a transition metal carbide, rare-earth element, magnesium (Mg), aluminum (Al), or the like.

The first and second electrodes 121 and 122, electrodes to which different polarities are applied, may be formed on the dielectric layers 111 and laminated in the Z direction and alternately disposed with respective dielectric layers 111 interposed therebetween in the capacitor body 110 in the Z direction.

In this case, the first and second internal electrodes 121 and 122 may be electrically insulated from each other by the dielectric layer 111 disposed therebetween.

The first internal electrode 121 is exposed through the third surface 3 of the dielectric layer 111 and the second internal electrode 12 is exposed through the fourth surface 4 of the dielectric layer 111.

End portions of the first and second internal electrodes 121 and 122 alternately exposed through the third and fourth surfaces 3 and 4 of the capacitor body 110 are respectively connected to the first and second external electrodes 131 and 132 disposed on both ends of the capacitor body 110 in the X direction, which is described below, so that the first and second internal electrodes 121 and 122 can be electrically connected to the first and second external electrodes 131 and 132.

According to such a composition, charges are accumulated between the first and second internal electrodes 121 and 122 when a voltage is applied to the first and second external electrodes 131 and 132.

Capacitance of the multilayer capacitor 100 is proportional to an area of overlap of the first and second internal electrodes 121 and 122, which overlap in the active region in the Z direction.

Further, materials forming the first and second internal electrodes 121 and 122 are not particularly limited, and may be a conductive paste including at least one of a noble metal material or nickel (Ni) and copper (Cu).

A method for printing the conductive paste may be a screen-printing method, a gravure printing method, or the like, but is not limited thereto.

The first and second external electrodes 131 and 132 are provided with a voltage having different polarities, and are disposed on both end portions of the body 110 in the X direction. The first and second external electrodes 131 and 132 are respectively connected to portions of the first and second internal electrodes 121 and 122 exposed through the third and fourth surfaces 3 and 4 of the capacitor body 110.

The first and second external electrodes 131 and 132 may include a first connection portion 131a and a first band portion 131b.

The first connection portion 131a is disposed on the third surface 3 of the capacitor body 110 and is in contact with an end portion of the first internal electrode 121, which is exposed externally through the third surface 3 of the capacitor body 110, to physically and electrically connect the first internal electrode 121 and the first external electrode 131.

The first band portion 131b extends from the first connection portion 131a to a portion of the first surface 1 of the capacitor body 110.

The first band portion 131b, if necessary, may further extend toward the second, fifth and sixth surfaces 2, 5 and 6 of the capacitor body 110 for improvement of adhesion strength.

The second external electrode 132 may include a second connection portion 132a and a second band portion 132b.

The second connection portion 132a is disposed on the fourth surface 4 of the capacitor body 110, is in contact with an end portion of the second internal electrode 122, which is exposed externally through the fourth surface 4 of the capacitor body 110, to physically and electrically connect the second internal electrode 122 and the second external electrode 132.

The second band portion 132b, if necessary, may further extend toward the second, fifth and sixth surfaces 2, 5 and 6 of the capacitor body 110 for improvement of adhesion strength.

The insulating layer 141 is disposed between a surface of the capacitor body 110 and the shielding layer 142. The insulating layer 141 covers the second surface 2 entirely, and covers the third, fourth, fifth and sixth surfaces 3, 4, 5 and 6.

A height of the insulating layer 141 in the Z direction is shorter than that of the capacitor body 110 so that portions of lower sides of the third, fourth, fifth and sixth surfaces 3, 4, 5 and 6 of the capacitor body 110 are exposed from the insulating layer 141.

The insulating layer 141 may include a polystyrene-based, vinyl acetate-based, polyester-based, polyethylene-based, polypropylene-based, polyamide-based, rubber-based or acrylic-based thermoplastic resin, a phenol-based, epoxy-based, urethane-based, melamine-based or alkyd-based thermosetting resin, a photosensitive resin, paraline, $SiO_x$ or $SiN_x$.

Alternatively, the insulating layer 141 may be formed of an adhesive layer.

As an example, when the insulating layer 141 and the shielding layer 142 are formed using a shielding sheet including an insulating film and a shield film, the insulating film of a shielding sheet may include an adhesive ingredient, thereby enabling the shield film to adhere to a surface of the capacitor body.

In such a case, an adhesive layer may be additionally formed on one surface of the insulating layer 141 between the capacitor body 110 and the one surface of the insulating layer 141.

Alternatively, no additional adhesive layer may be formed on one surface of the insulating layer 141 in such a case in which the insulating layer 141 is formed using a B-stage insulating film.

Such an insulating layer 141 may be formed by applying a liquid insulating resin to a surface of the body 110, laminating an insulating film, such as a dry film (DF), on the capacitor body 110, or forming an insulating resin on a surface of the capacitor body 110 by vapor deposition.

For the insulating film, a polyimide film, an Ajinomoto build-up film (ABF) excluding a photosensitive insulating resin may be used.

The shielding layer 142 reduced leakage flux leaking from the electronic component 100 externally, and may include a cap portion disposed on the second surface 2 of the capacitor body 110 and a side wall portion disposed on the third, fourth, fifth and sixth surfaces 3, 4, 5 and 6 of the capacitor body 110.

In other words, the shielding layer 142 is disposed on all surfaces of the capacitor body 110 excluding the first surface 1.

Such a shielding layer 142 may have an integrated form of the cap portion and the side wall portion using the vapor deposition process or by attaching the shielding sheet formed of an insulating film or a shield film to the third, fourth, fifth and sixth surfaces 3, 4, 5 and 6 of the capacitor body 110 or laminating on the second surface 2. For example, the shielding layer 142 covers the second surface 2 entirely, and covers the third, fourth, fifth and sixth surfaces 3, 4, 5 and 6.

Such a shielding layer 142 may include at least one of a conductive material and a magnetic material.

As an example, the conductive material may be a metal including at least one selected from the group consisting of copper (Cu), silver (Ag), gold (Au), aluminum (Al), iron (Fe), silicon (Si), boron (B), chrome (Cr), niobium (Nb) and nickel (Ni) or an alloy. The conductive material may be Fe—Si or Fe—Ni.

Additionally, the shielding layer 142 may include at least one selected from the group consisting of ferrite, permalloy, and an amorphous ribbon.

The shielding layer 142 may be, for example, a copper-deposited layer, but is not limited thereto.

Further, the shielding layer may be a multilayer structure, for example, a double layer structure of a conductive material layer and a magnetic material layers formed thereon, a double layer structure of a first conductive material layer and a second conductive layer formed on the first conductive material layer, or a double layer structure of multi-conductive materials.

The first and second conductive layers may include different or the same conductive materials.

According to an example embodiment, the shielding layer 142 is disposed on the electronic component 100 itself, and thus is distinguished from a shield can, which is mounted on a printed circuit board and then coupled to the printed circuit board for shielding EMI, or the like.

As an example, in contrast to the shield can, it is not necessary to consider connection of the printed circuit board with a ground layer for the shielding layer 142 of the present disclosure.

A total number of electronic components 100 included in an electronic device and a distance between adjacent electronic components 100 are decreasing as the electronic devices become slimmer and more highly efficient. In this regard, leakage flux occurring in each electronic component 100 can be more effectively prevented by shielding the electronic component 100 itself, thereby making it more advantageous for the slimming and high performance of the electronic device.

In addition, compared to the case in which the shield can is used, use of the shielding layer 142 facilitates an increase in an amount of effective magnetic materials in a shielded region, thereby improving characteristics of the electronic component 100.

The insulating layer 141 and the shielding layer 142 are formed on the electronic component according to an example embodiment itself. The height of the insulating layer 141 and the shielding layer 142 in the Z direction connecting the first and second surfaces 1 and 2 is shorter than the overall height of the capacitor body 110 in the Z direction connecting the first and second surfaces 1 and 2, thereby creating the lower portion of the capacitor body 110, in which the insulating layer 141 and the shielding layer 142 are not formed.

In other words, due to the part of the lower portion of the capacitor body 110 not covered by the insulating layer 141 and the shielding layer 142 but exposed, not only leakage flux occurring in the electronic component 100 is prevented but also physical contact with a solder is prevented when mounting a substrate, thereby preventing an electrical short between the shielding layer 142 and the first and second external electrodes 131 and 132.

The height (t) of the lower portion of the capacitor body 110, in which the insulating layer 141 and the shielding layer 142 are not formed, may be 50 μm<t<150 μm.

In Table 1 below, an amount of the leakage flux is measured by scanning a chip using a magnetic field probe and measuring magnetic field strength.

In Table 1, #1, in which t is Air, refers to a multilayer capacitor having no insulating and shielding layers. In this case, the leakage flux amount is 225.14 A/m, a significantly large amount. #1 becomes a comparative group for #2 to #5.

In the case of #5 whose height (t) of the lower portion of the capacitor body 110, in which the insulating layer 141 and the shielding layer 142 are not formed, is 150 μm or above, degree of shielding with respect to complete shielding is significantly reduced to 90.16%, compared to #1.

In this regard, it is preferable that a maximum height (t) of the lower portion of the capacitor body 110, in which the insulating layer 141 and the shielding layer 142 are not formed, be less than 150 μm.

Additionally, in the case of #3 whose height (t) of the lower portion of the capacitor body 110, in which the insulating layer 141 and the shielding layer 142 are not formed, is 50 μm or less, the shielding layer 142 and a solder are more likely to be in physical contact with each other when mounting a substrate. This will generate a short, thereby giving rise to loss of functions of the electronic component 100.

In this regard, it is preferable that a minimum height (t) of the lower portion of the capacitor body 110, in which the insulating layer 141 and the shielding layer 142 are not formed, be above 50 μm.

Accordingly, the height (t) of the lower portion of the capacitor body 110, in which the insulating layer 141 and the shielding layer 142 are not formed, may be 50 μm<t<150 μm. In the case of #4 satisfying the range, degree of shielding with respect to complete shielding is 94.16%, which is good and in which a short does not occur.

TABLE 1

| # | t (μm) | Leakage flux amount (A/m) | Degree of shielding with respect to complete shielding (%) | Short occurrence (EA) |
|---|---|---|---|---|
| 1 | Air | 225.14 | 0 | — |
| 2 | 0 | 7.65 | 96.60 | 100/100 |
| 3 | 50 | 10.23 | 95.46 | 5/100 |
| 4 | 100 | 13.13 | 94.16 | 0/100 |
| 5 | 150 | 22.16 | 90.16 | 0/100 |

A ratio (t/T) of 4, to the overall height (T) of the capacitor body 110 may satisfy $0.0625 \leq t/T \leq 0.1875$.

When the ratio of the height (t) of the lower portion of the capacitor body 110, in which the insulating layer 141 and the shielding layer 142 are not formed, to the overall height (T) of the capacitor body 110 is less than 0.0625, shielding effect of the capacitor body 110 may be significantly reduced.

In contrast, when the ratio of the height (t) of the lower portion of the capacitor body 110, in which the insulating layer 141 and the shielding layer 142 are not formed, to the overall height (T) of the capacitor body 110 exceeds 0.1875, the shielding layer 142 and a solder are more likely to be in physical contact with each other when mounting a substrate, which will generate a short, thereby giving rise to loss of functions of the electronic component 100.

Accordingly, the ratio (t/T) of the height (t) of the lower portion of the capacitor body 110, in which the insulating layer 141 and the shielding layer 142 are not formed, to the overall height (T) of the capacitor body 110 may be 0.0625 to 0.1875.

For example, when the overall height of the capacitor body 110 is 0.8 mm, the height (t) of the lower portion of the capacitor body 110, on which the insulating layer 141 and the shielding layer 142 are not formed, may satisfy 0.05 mm<t<0.15 mm.

Meanwhile, as shown in FIG. 5, in an example embodiment, when the band portions 131b and 132b of the first and second external electrodes 131 and 132 extend to a part of the second surface 2 of the capacitor body 110, the insulating layer 141 and the shielding layer 142 may have a shape in which a center portion is concave by such band portions of the external electrode.

Figure 6:
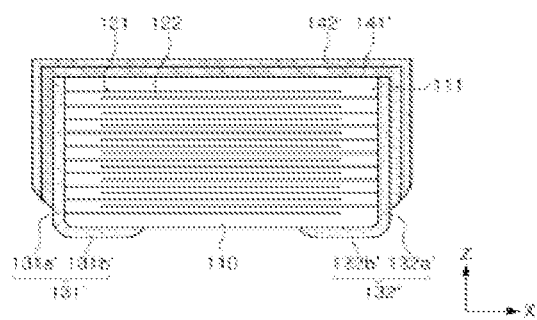
FIG. 6 is a cross-sectional view of another example of the external electrodes.

Alternatively, as shown in FIG. 6, first and second band portions 131b' and 132b' of first and second external electrodes 131' and 132' may not be formed on the second surface 2 of the capacitor body 110.

In this case, an insulating layer 141' covers an upper surface of the capacitor body 110 while being in close contact with the entire second surface 2 of the capacitor body 110, and a shielding layer 142' formed on the insulating layer 141' may have a flat top surface. In this case, the insulating layer 141' covers the upper surface of the capacitor body 110 while being in direct contact with the entire second surface 2 of the capacitor body 110.

Figure 7:
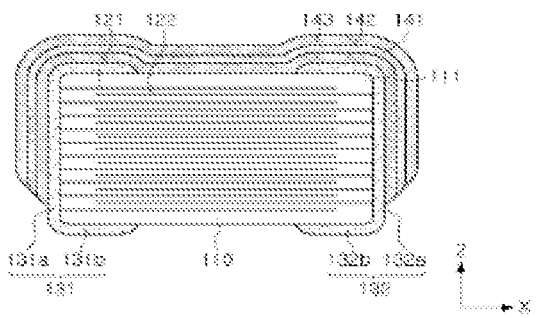
FIG. 7 is a cross-sectional view of an additionally formed cover layer.

Referring to FIG. 7, an electronic component of an example embodiment may further include a cover layer 143 disposed on the shielding layer 142 to cover the shielding layer 142.

The cover layer 143 is disposed on the shielding layer 142 to cover the shielding layer 142 while exposing an end portion of the shielding layer 142.

Such a cover layer 143 may include a polystyrene-based, vinyl acetate-based, polyester-based, polyethylene-based, polypropylene-based, polyamide-based, rubber-based or acrylic-based thermoplastic resin, a phenol-based, epoxy-based, urethane-based, melamine-based or alkyd-based thermosetting resin, a photosensitive resin, paraline, $SiO_x$ or $SiN_x$.

Further, the cover layer 143 may be formed simultaneously with the insulating layer 141 and the shielding layer 142 disposing an insulating film of a shielding sheet consisting of an insulating film, a shield film and a cover film to face the capacitor body and laminating the shielding sheet on the capacitor body.

As another example, the cover layer 143 may be formed by laminating a cover film on the shielding layer 142 formed on the capacitor body 110. As another example, the cover layer 143 may be formed on the second to sixth surfaces of the capacitor body 110 by forming an insulating material with vapor deposition, such as chemical vapor deposition (CVD), or the like.

The cover layer 143 may have an adhesive function. For example, a cover film in a shielding sheet consisting of an insulating film, a shield film and a cover film may have an adhesive ingredient to adhere to the shield film.

According to the present disclosure, leakage flux of an electronic component is reduced and component characteristics are substantially retained.

In addition, due to the shielding layer surrounding the capacitor body spaced apart from the mounting surface of the capacitor body, a short between a solder and an EMI-shielding layer can be prevented when mounting the electronic component While example embodiments have been shown and described above, it will be apparent to those skilled in the art that modifications and variations could be made without departing from the scope of the present disclosure as defined by the appended claims.

What is claimed is:

1. An electronic component, comprising:
   a capacitor body comprising a dielectric layer and first and second internal electrodes, and a first surface and a second surface opposing each other, a third surface and a fourth surface connected to the first and second surfaces and opposing each other, and a fifth surface and a sixth surface connected to the first to fourth surfaces and opposing each other, the first internal electrode and the second internal electrode being exposed through the third surface and the fourth surface, respectively;
   first and second external electrodes respectively extending from the third and fourth surfaces of the body to a portion of the first surface and respectively connected to the first and second internal electrodes;
   a shielding layer comprising a cap portion disposed on the second surface of the capacitor body and a side wall portion disposed on the third, fourth, fifth and sixth surfaces of the capacitor body; and
   an insulating layer disposed between the capacitor body and the shielding layer,
   wherein a lower portion including a side surface of the capacitor body is exposed from the insulating layer and the shielding layer.

2. The electronic component of claim 1, wherein a height (t) of the lower portion of the capacitor body in a direction connecting first and second surfaces in which the insulating layer and the shielding layer are not formed is shorter than an overall height (T) of the capacitor body in the direction connecting the first and second surfaces so that the lower portion of the capacitor body is exposed from the insulating layer and the shielding layer.

3. The electronic component of claim 2, wherein the height (t) satisfies 50 µm<t<150 µm.

4. The electronic component of claim 2, wherein a ratio (t/T) satisfies 0.0625≤t/T≤0.1875.

5. The electronic component of claim 2, wherein the height (t) satisfies 50 µm<t.

6. The electronic component of claim 2, wherein the height (t) satisfies t<150 µm.

7. The electronic component of claim 2, wherein a ratio (t/T) satisfies 0.0625≤t/T.

8. The electronic component of claim 2, wherein a ratio (t/T) satisfies t/T≤0.1875.

9. The electronic component of claim 1, further comprising a cover layer disposed on the shielding layer and made of an insulating material.

10. The electronic component of claim 9, wherein the lower portion of the capacitor body is exposed from the cover layer.

11. The electronic component of claim 1, wherein the first and second external electrodes comprise:
    first and second connection portions respectively disposed on the third and fourth surfaces of the capacitor body and connected to the first and second internal electrodes; and
    first and second band portions respectively extending from the first and second connection portions to the portion of the first surface of the capacitor body.

12. The electronic component of claim 11, wherein among the first and second surfaces, the first and second band portions of the first and second external electrodes are disposed only on the first surface of the capacitor body, and the insulating layer and the shielding layer have flat top surfaces.

13. The electronic component of claim 11, wherein the first and second band portions further extend onto portions of the second, fifth and sixth surfaces of the capacitor body.

14. The electronic component of claim 13, wherein each of the insulating layer and the shielding layer disposed on the second surface has a concave shape.

15. The electronic component of claim 1, wherein the insulating layer is made of an adhesive layer.

16. The electronic component of claim 1, wherein, on at least one surface of the capacitor body, a lowermost edge of the insulating layer is lower than a lowermost edge of the shielding layer.

* * * * *